United States Patent
Yamawaki et al.

(10) Patent No.: US 10,416,663 B2
(45) Date of Patent: Sep. 17, 2019

(54) MOTOR CONTROL APPARATUS, MOTOR CONTROL METHOD, INFORMATION PROCESSING PROGRAM, AND RECORDING MEDIUM

(71) Applicant: OMRON Corporation, Kyoto (JP)

(72) Inventors: Satoshi Yamawaki, Ritto (JP); Takao Ushiyama, Ritto (JP); Masakazu Matsugami, Ritto (JP); Takaya Kitano, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/382,730

(22) Filed: Dec. 18, 2016

(65) Prior Publication Data

US 2017/0261973 A1 Sep. 14, 2017

(30) Foreign Application Priority Data

Mar. 10, 2016 (JP) .................. 2016-047565

(51) Int. Cl.
G05B 23/02 (2006.01)
H02P 1/02 (2006.01)
G05B 9/02 (2006.01)
G05B 19/042 (2006.01)
G05B 19/406 (2006.01)

(52) U.S. Cl.
CPC .......... G05B 23/0289 (2013.01); G05B 9/02 (2013.01); G05B 19/0425 (2013.01); G05B 19/406 (2013.01); G05B 23/0291 (2013.01); H02P 1/022 (2013.01); G05B 2219/24024 (2013.01); G05B 2219/25104 (2013.01); G05B 2219/33105 (2013.01); G05B 2219/34459 (2013.01);

(Continued)

(58) Field of Classification Search
CPC .......... G01R 31/343; G01R 31/3624; G01R 31/3658; H02P 23/14; H02P 31/00; H02P 23/0031; H02P 27/04; H02P 6/14; H02P 21/00; H02P 25/08; H02P 29/664; H02P 6/00; H02P 6/16; H02P 29/00; H02P 5/50
USPC .......................................... 318/707
See application file for complete search history.

(56) References Cited

U.S. PATENT DOCUMENTS 5,239,247 A * 8/1993 Habig .................. H02P 5/50
                                               318/34
6,119,610 A * 9/2000 Nishizawa ............ D05B 19/14
                                               112/220

(Continued)

FOREIGN PATENT DOCUMENTS

CN    1252110       5/2000
DE    102009007559  8/2010

(Continued)

OTHER PUBLICATIONS

"Search Report of Europe Counterpart Application", dated Nov. 27, 2017, p. 1-p. 8.

(Continued)

Primary Examiner — Jorge L Carrasquillo
(74) Attorney, Agent, or Firm — JCIPRNET

(57) ABSTRACT

When a motor replacement detection portion (4) detects replacement of a motor (M), a control portion (2) of the motor control apparatus executes limiting processing for limiting action of the motor (M), at least until an acceptance portion (5) accepts an input of confirmation information from a user.

14 Claims, 8 Drawing Sheets

(52) U.S. Cl.
CPC ............. *G05B 2219/37494* (2013.01); *G05B 2219/43048* (2013.01)

(56) References Cited

U.S. PATENT DOCUMENTS

| | | | | |
|---|---|---|---|---|
| 6,570,358 B2* | 5/2003 | Nakatsugawa | ........... | H02P 6/16 318/490 |
| 7,135,830 B2* | 11/2006 | El-Ibiary | ................. | H02P 23/14 318/560 |
| 7,184,902 B2* | 2/2007 | El-Ibiary | ................. | H02P 23/14 702/60 |
| 7,707,461 B2* | 4/2010 | Dougherty | ........... | G11B 19/048 714/47.2 |
| 7,719,234 B2* | 5/2010 | Carrier | ...................... | B25F 5/00 320/112 |
| 8,917,045 B2* | 12/2014 | Durfee | ...................... | G06F 8/60 318/490 |
| 9,048,776 B2* | 6/2015 | Tio | ............................. | H02P 6/14 |
| 9,491,242 B2* | 11/2016 | Bomkamp | .............. | H04L 67/12 |
| 2002/0033686 A1* | 3/2002 | Uhl | ........................... | H02P 6/00 318/560 |
| 2002/0167289 A1* | 11/2002 | Nakatsugawa | ........... | H02P 6/16 318/727 |
| 2004/0162704 A1* | 8/2004 | Siegel | .................. | G05B 19/406 702/183 |
| 2005/0067991 A1* | 3/2005 | El-Ibiary | ................. | H02P 23/14 318/490 |
| 2005/0071095 A1* | 3/2005 | El-Ibiary | ................. | H02P 23/14 702/60 |
| 2005/0073282 A1* | 4/2005 | Carrier | ...................... | B25F 5/00 320/106 |
| 2005/0200326 A1* | 9/2005 | Mayhew | ............ | G05B 19/0426 318/600 |
| 2007/0118307 A1* | 5/2007 | El-Ibiary | ................. | H02P 23/14 702/60 |
| 2007/0118308 A1* | 5/2007 | El-Ibiary | ................. | H02P 23/14 702/60 |
| 2008/0180084 A1* | 7/2008 | Dougherty | ........... | G11B 19/048 324/72 |
| 2008/0203995 A1* | 8/2008 | Carrier | ...................... | B25F 5/00 323/351 |
| 2008/0303472 A1* | 12/2008 | John | .................. | G05B 19/0426 318/568.2 |
| 2011/0196632 A1* | 8/2011 | Shimizu | .............. | G01R 31/3624 702/63 |
| 2014/0084837 A1* | 3/2014 | Tio | ............................. | H02P 6/14 318/519 |
| 2014/0084841 A1* | 3/2014 | Middlestetter | .......... | H02P 29/00 318/772 |
| 2014/0139166 A1* | 5/2014 | Durfee | ...................... | G06F 8/60 318/494 |
| 2014/0148103 A1* | 5/2014 | Honda | .................. | H04W 24/10 455/67.11 |
| 2015/0084571 A1* | 3/2015 | Durfee | ...................... | H02P 31/00 318/494 |
| 2015/0242923 A1* | 8/2015 | Kreidler | ............. | G06Q 30/0623 705/26.61 |
| 2015/0270800 A1* | 9/2015 | Tio | ............................. | H02P 6/14 318/400.26 |
| 2015/0292917 A1 | 10/2015 | Omura et al. | | |
| 2015/0296050 A1* | 10/2015 | Bomkamp | .............. | H04L 67/12 709/217 |
| 2015/0300923 A1* | 10/2015 | Halbert | .................... | G07C 3/00 702/122 |
| 2017/0048324 A1* | 2/2017 | Bomkamp | .............. | H04L 67/12 |
| 2017/0063286 A1* | 3/2017 | Durfee | .................... | H02P 31/00 |
| 2017/0091672 A1* | 3/2017 | Sasaki | ..................... | H02P 29/40 |
| 2017/0285592 A1* | 10/2017 | Biery, II | ................. | G05B 15/02 |

FOREIGN PATENT DOCUMENTS

| | | |
|---|---|---|
| JP | H09311055 | 12/1997 |
| JP | 2003-102195 | 4/2003 |
| JP | 2003102195 A * | 4/2003 |
| JP | 2003153570 | 5/2003 |
| JP | 2009195087 | 8/2009 |
| JP | 2013226000 | 10/2013 |
| WO | 9943882 | 9/1999 |

OTHER PUBLICATIONS

"Office Action of Japan Counterpart Application," dated Sep. 4, 2018, with English translation thereof, pp. 1-11.

"Office Action of China Counterpart Application," dated Dec. 11, 2018, with English translation thereof, p. 1-p. 19.

\* cited by examiner

MOTOR CONTROL APPARATUS, MOTOR CONTROL METHOD, INFORMATION PROCESSING PROGRAM, AND RECORDING MEDIUM

CROSS REFERENCE TO RELATED APPLICATIONS

This application claims the priority benefit of Japanese Patent Application No. 2016-047565, filed on Mar. 10, 2016. The entirety of the above-mentioned patent application is hereby incorporated by reference herein and made a part of this specification.

BACKGROUND OF THE INVENTION

1. Field of the Invention

The present invention relates to a motor control apparatus, and the like, in particular, to a motor control apparatus, and the like that can enable a motor after replacement to perform action in state of ensuring security when a motor as a control object is replaced.

2. Description of Related Art

In the past, there is a known control system (system), including: a servo motor (servo motor), which carries an encoder (encoder) that detects location information of the motor; and a servo driver (servo driver) (a motor control apparatus), which performs feedback (feedback) control on action of the motor based on information from the encoder. The servo driver controls action of loading machinery, for example, a machine tool, connected to the motor by controlling action of the motor, for example, the servo driver can well perform positioning control of enabling the loading machinery to move to a needed location.

In the positioning control, a location of the loading machinery is generally controlled based on an origin location as a location reference of the loading machinery. That is, the servo driver can suitably control the location of the loading machinery in state where a correspondence between the origin location and the location information of the motor is identified. On the other aspect, in state where an origin is not determined, an actual location of the loading machinery deviates from the location information of the motor (location deviation). Therefore, in the state where the origin is not determined, the servo driver cannot perform the positioning control of the loading machinery.

In addition, in various motors, motor identification information, for example, an inherent identification code (code), of each motor exists, and the motor identification information is generally owned by an encoder. The servo driver can obtain information needed by motor control, for example, a control parameter (parameter) of the motor and inherent attributes of the motor according to the motor identification information. That is, the servo driver communicates with the encoder to identify the motor identification information, so as to suitably control the motor.

In this control system, when motor replacement is performed, a motor control method disclosed in patent document 1, as a method that can enable a motor after the replacement to smoothly operate is known.

As shown in FIG. 8, a control system 100 of the motor control method disclosed in patent document 1 includes a control apparatus 110, an encoder 120, and a motor 130. The control apparatus 110 includes a central processing unit (Central Processing Unit, CPU) 111 and an electrically erasable read only memory (Electrically Erasable Read Only Memory, EEROM) 112. The encoder 120 includes a CPU 121 and an EEROM 122. In the EEROM 112 and the EEROM 122, an identification (Identification, ID) of the motor is used to store motor-specific parameters, and the like.

When a power supply is connected, the control apparatus 110 queries the CPU 121 of the encoder 120 about an identification (ID). In a case in which an answer of the query is different from the identification (ID) originally obtained by the control apparatus 110 (in a case in which motor replacement is performed), the identification (ID) of the control apparatus 110 and the identification (ID) of the encoder 120 are rewritten as information about a motor after the replacement, and inherent attributes of the motor are written into the EEROM 112, and then control is performed on the motor after the replacement. Therefore, with the replacement of the motor, the inherent attributes of the motor after the replacement can be automatically obtained, and information of a memory is automatically rewritten, so as to enable, based on the information, the motor after the replacement to operate smoothly.

PRIOR ART DOCUMENT

Patent Document

Patent document 1: JP Patent Publication No. 2003-102195 gazette (published on Apr. 4, 2003)

However, if motor information separately stored in the control apparatus 110 and the encoder 120 is automatically rewritten as the inherent information of the motor after the replacement so as to start control on the motor after the replacement, then the motor after the replacement sometimes enters a state where an origin is not determined because an origin location, and the like are unclear, and consequently, unexpected action is performed when action is started.

In particular, in a motor that carries a batteryless absolute encoder (batteryless absolute encoder), because absolute location information is always kept, generally, even if the motor is replaced, an abnormal alarm is not given, and consequently, a user (user) cannot be notified of location deviation. As a consequence, the following problem exists: the probability of performing unexpected action when action is started becomes higher.

SUMMARY OF THE INVENTION

The present invention implements motor control, and can enable a motor after replacement to perform action in state of ensuring security when a motor as a control object is replaced.

To resolve the problem, a motor control apparatus in a form of the present invention performs motor control, where the motor control apparatus includes: a control portion, configured to control action of the motor; a motor replacement detection portion, configured to detect a condition of replacement of the motor; and an acceptance portion, configured to accept input from a user; when the motor replacement detection portion detects the replacement of the motor, the control portion executes limiting processing for limiting the action of the motor, at least until the acceptance portion accepts, from the user, input of confirmation information of a confirmed intention of the replacement of the motor.

According to the structure, in a case in which the motor replacement detection portion detects the replacement of the motor, the control portion executes the limiting processing for limiting the action of the motor. The limiting processing lasts at least until the acceptance portion accepts, from the user, the input of the confirmation information of the confirmed intention of the replacement of the motor. Therefore, in a case in which the replacement of the motor is performed, the user must confirm the replacement of the motor and enter the confirmation information, and therefore after the user can confirm security, that is, confirm whether control on the motor can be started, the user enters the confirmation information to the acceptance portion to start control on the motor.

In addition, in a case in which location deviation, and the like of the motor exist, and origin reset processing, for example, origin restoration needs to be performed when the user confirms the state of the motor, the user can enter the confirmation information to the acceptation portion after the origin reset processing is performed. A result thereof: the motor after the replacement can be prevented from performing unexpected action when action is started.

Therefore, the following effect is achieved: a motor control apparatus can be provided, and after the replacement of the motor as the control object is performed, the motor after the replacement can be enabled to perform action in state of ensuring security.

Preferably, the limiting processing includes: at least one of processing of making, from outside, an instruction for the control portion become invalid, processing of forbidding outputting a drive signal to the motor, or processing of inhibiting an output value of the drive signal for the motor.

According to the structure, when the motor replacement detection portion detects the replacement of the motor, the motor is limited by at least one of the action limitations, and cannot perform general action, at least until the acceptance portion accepts, from the user, the input of the confirmation information of the confirmed intention of the replacement of the motor. Therefore, the following effect is achieved: even if the action of the motor is to be started in state where location deviation occurs to the motor, damages of the motor or loading machinery caused by unexpected action can also be prevented.

Preferably, the limiting processing includes processing of enabling an instruction of a specific type in multiple instructions from the outside not to be executed.

According to the structure, when the motor replacement detection portion detects the replacement of the motor, even if multiple instructions are sent to the control portion from the outside, the control portion does not execute the instruction of the specific type in the multiple instructions. Therefore, even if in a case in which the limiting processing is executed, the control portion can also execute instructions other than the instruction of the specific type. For example, the following effect is achieved: an instruction, irrelevant with the action of the motor, for reading a current location or parameter of the motor can be executed.

Preferably, when the motor replacement detection portion detects the replacement of the motor, the control portion executes the limiting processing until the acceptance portion accepts, from the user, the input of the confirmation information of the confirmed intention of the replacement of the motor and origin reset processing of the motor is completed.

According to the structure, the motor cannot perform general action, until the origin reset processing, for example, the origin restoration is completed. Therefore, the probability of performing general action by the motor in state where location deviation occurs is reduced.

A result thereof: the following effect is achieved: damages of the motor or driving machinery caused by unexpected action can be prevented more practically.

Preferably, the motor replacement detection portion obtains control object motor information relevant to the motor as a control object, and detects the condition of the replacement of the motor based on the control object motor information; and the acceptance portion accepts, from the user, an update indication of the control object motor information as the confirmation information.

According to the structure, the motor replacement detection portion detects whether the motor has been replaced based on the control object motor information relevant to the motor as the control object. In addition, the user enters an update indication of the control object motor information as the confirmation information to the acceptance portion, and the control portion executes the limiting processing, until input of the update indication is performed.

Therefore, to remove the limiting processing, the user must indicate the update of the control object motor information. A result thereof: the following effect is achieved: the user is simply queried about whether the motor is replaced, which can reduce the probability of entering the confirmation information by mistake by the user.

Preferably, the control object motor information includes inherent identification information of the motor as the control object, that is, control object motor identification information; and the motor replacement detection portion compares whether inherent identification information of a currently connected motor, that is, connected motor identification information is consistent with the control object motor identification information, and in a case in which the connected motor identification information is inconsistent with the control object motor identification information, detects the condition of the replacement of the motor.

According to the structure, the motor replacement detection portion detects the replacement of the motor based on the inherent identification information of the motor. The inherent information of the motor herein is one-to-one corresponding to motors, and therefore if the identification information is different, then it can be said practically that the motor has been replaced.

Therefore, the following effect is achieved: the replacement of the motor can be detected more practically.

Preferably, the motor control apparatus includes: a notification portion, configured to notify state of the motor; in a case in which the motor replacement detection portion detects the replacement of the motor, the notification portion notifies abnormal information of the intention of the replacement of the motor.

According to the structure, in a case in which the motor replacement detection portion detects the replacement of the motor, the notification portion notifies abnormal information of the intention of the replacement of the motor. Therefore, the following effect is achieved: the user can easily recognize, according to the notified abnormal information, the condition of the replacement of the motor and the condition that the action of the motor is limited.

Preferably, in a case in which the acceptance portion accepts, from the user, the input of the confirmation information of the confirmed intention of the replacement of the motor, the notification portion removes the abnormal information, and after the abnormal information is removed, the notification portion notifies alarm information that indicates the intention thereof in a case in which an origin location of the motor is unclear.

According to the structure, after the abnormal information is removed, the notification portion notifies the alarm information in the case in which the origin location of the motor is unclear, so as to notify the user of two phases. Therefore, when the user performs the input of the confirmation information of the confirmed intention of the replacement of the motor, the user can further recognize that origin deviation of the motor must be eliminated. A result thereof: the user can be urged to practically perform elimination of the motor location deviation. In addition, the user can accurately master current conditions.

Therefore, the following effect is achieved: a motor control apparatus can be provided, which can enable the motor after the replacement to perform action in state of ensuring security of the motor after the replacement.

Preferably, in a case in which the origin reset processing of the motor is performed, the notification portion removes the alarm information.

According to the structure, in the case in which the origin reset processing, for example, the origin restoration is performed, the alarm information is removed. Therefore, the user can easily determine whether the origin reset processing of the motor is performed. In addition, the user can easily master, based on the information, the condition that the location deviation of the motor has been eliminated. A result thereof: the probability of starting the action of the motor in state where location deviation occurs to the motor is further reduced.

Therefore, the following effect is achieved: damages of the motor or driving machinery caused by unexpected action can be further prevented.

Preferably, the motor control apparatus includes: a storage portion, configured to store the control object motor information, where the motor replacement detection portion obtains the control object motor information from the storage portion.

According to the structure, the motor control apparatus has the storage portion that stores the control object motor information. Therefore, the following effect is achieved: in a same apparatus, the motor replacement detection portion can obtain the control object motor information from the storage portion.

Preferably, the motor replacement detection portion obtains the control object motor information from the motor or an encoder carried on the motor.

According to the structure, in a case in which the motor has been replaced, the motor and the encoder are both replaced, and therefore the control object motor information is not stored in the motor or encoder after the replacement. Therefore, the following effect is achieved: in a case in which the control object motor information obtained from the motor or the encoder carried on the motor is 0 (null (NULL)), the motor replacement detection portion needs to only detect that the motor has been replaced, so as to detect the replacement of the motor more easily and more practically.

In addition, even if in a case in which the storage portion of the motor or encoder after the replacement pre-stores the control object motor information, when the control object motor information obtained from the motor or encoder after the replacement is inconsistent with the connected motor information, it is detected that the motor has been replaced. On such basis, the replacement of the motor can be detected more easily and practically.

Preferably, the motor replacement detection portion obtains the control object motor information from an upper controller connected to the motor control apparatus.

According to the structure, in a case in which the motor control apparatus connected to the upper controller is replaced, a motor control apparatus after the replacement can obtain the control object motor information from the upper controller.

Preferably, the motor control apparatus further includes: a switching portion, configured to switch the control portion between execution or non-execution of the limiting processing, where the switching portion obtains usage information relevant to usage of the motor as the control object, and does not execute the limiting processing in a case in which the usage information indicates increment (increment) type usage.

According to the structure, in a case in which the usage of the motor is the increment type, even if the replacement of the motor is performed, the action of the motor is not limited. Therefore, in a case in which the usage of the motor is the increment type and the motor is replaced, the user does not need extra work, so as to improve convenience.

In addition, to resolve the problem, a motor control method in a form of the present invention performs motor control, where the motor control method includes: a motor replacement detection step: detecting a condition of replacement of the motor; and an action limiting step: when the replacement of the motor is detected in the motor replacement detection step, limiting action of a motor after the replacement, at least until input of confirmation information of a confirmed intention of the replacement of the motor is accepted from a user.

According to the structure, in a case in which the replacement of the motor is detected in the motor replacement detection step, the action limiting step for limiting the action of the motor after the replacement is started. The action limiting step lasts at least until the input of the confirmation information of the confirmed intention of the replacement of the motor is accepted from the user.

Therefore, after the user can confirm security, that is, confirm whether control on the motor can be started, the user enters the confirmation information to start control on the motor.

Therefore, the motor control method achieves the following effect: when the replacement of the motor as the control object is performed, the motor after the replacement can be enabled to perform action in state of ensuring security.

The present invention achieves at least the following effects: a motor control apparatus can be implemented, and after replacement of a motor as a control object is performed, a motor after the replacement can be enabled to perform action in state of ensuring security.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
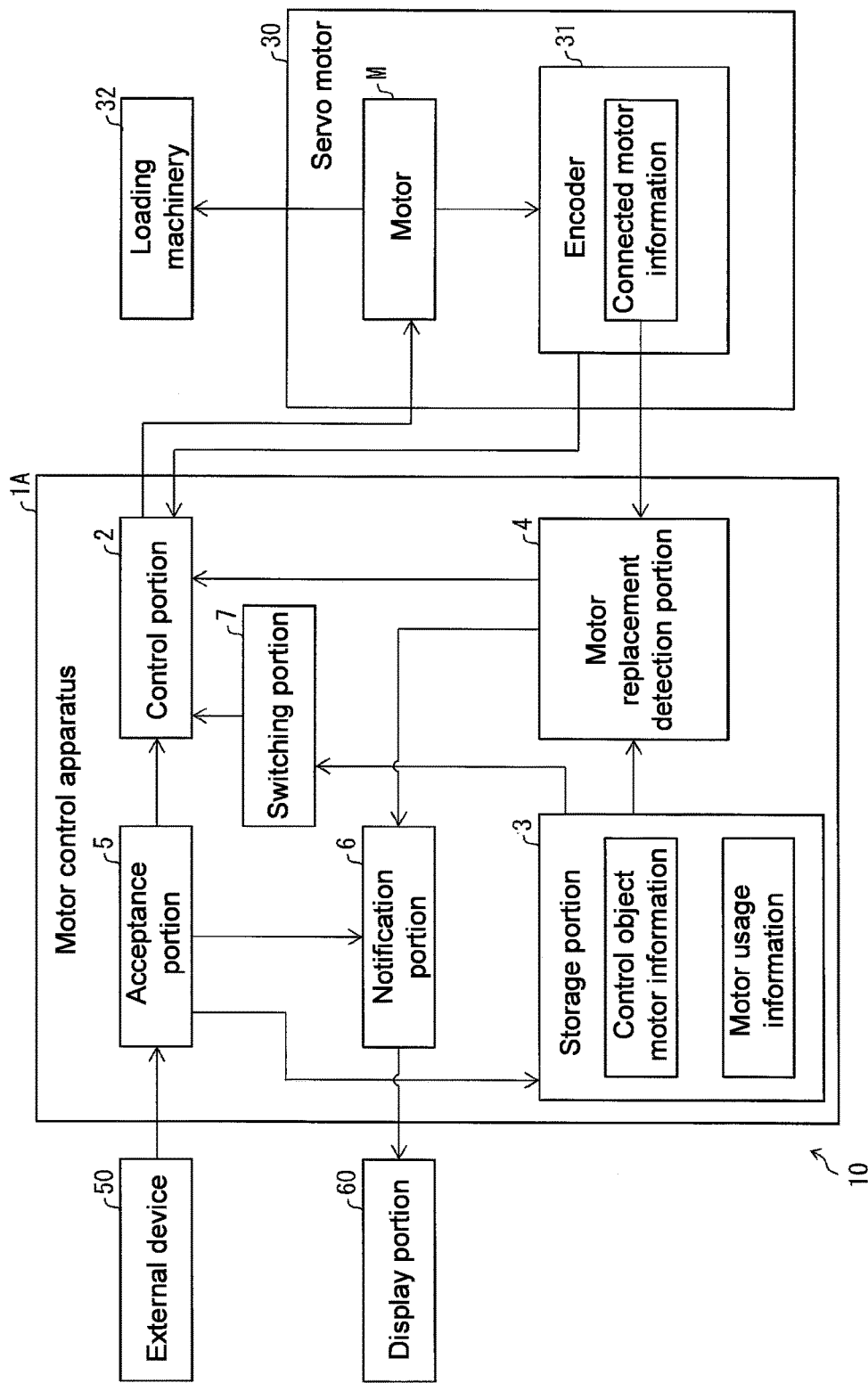
FIG. 1 is a block diagram that illustrates a schematic structure of a motor control apparatus and a control system that includes the motor control apparatus in implementation manner 1 of the present invention.

Reference will now be made in detail to the present preferred embodiments of the invention, examples of which are illustrated in the accompanying drawings. Wherever possible, the same reference numbers are used in the drawings and the description to refer to the same or like parts.

[Implementation Manner 1]

Figure 2:
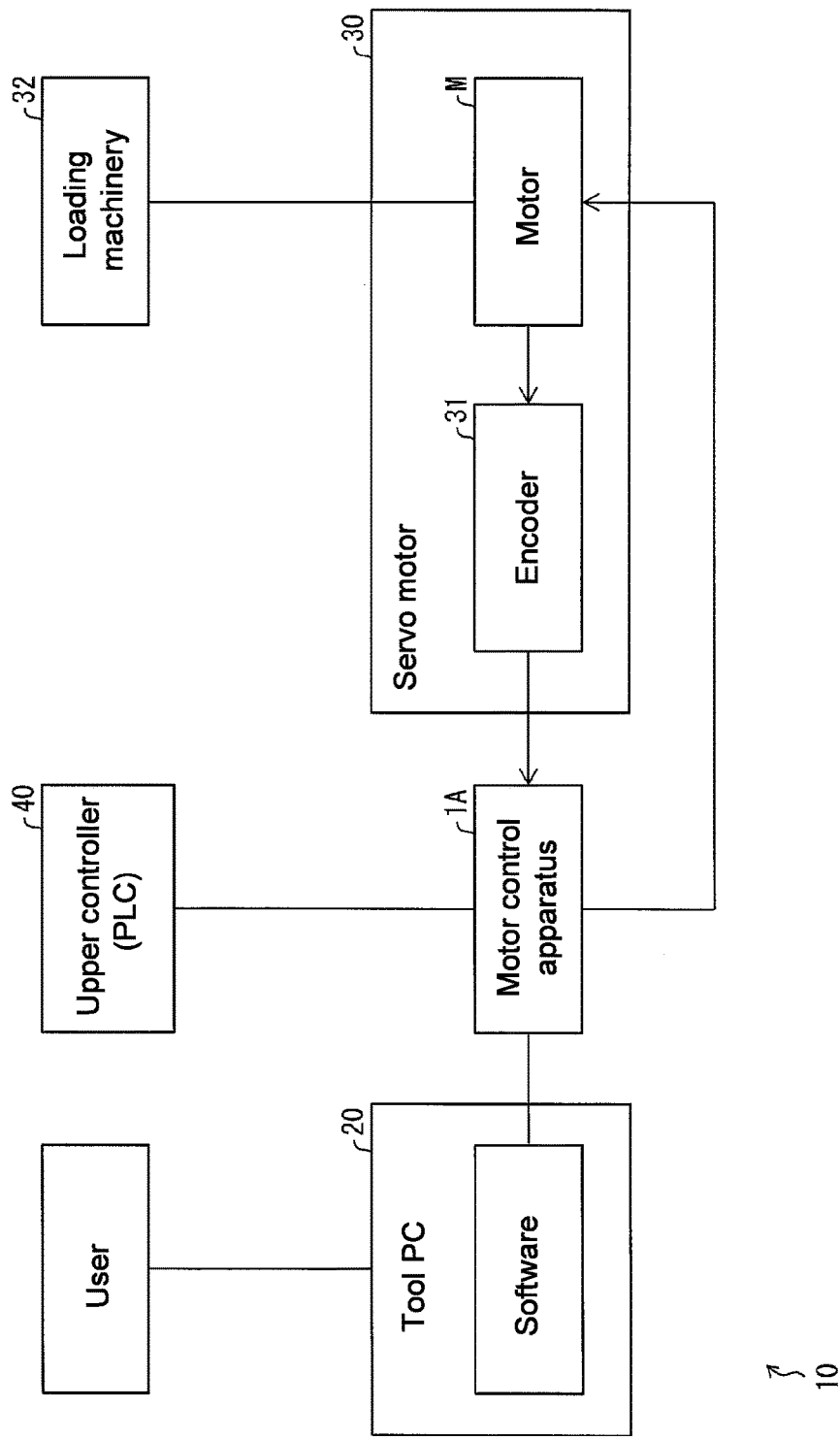
FIG. 2 is a diagram that illustrates an outline of the control system that includes the motor control apparatus.
Figure 3:
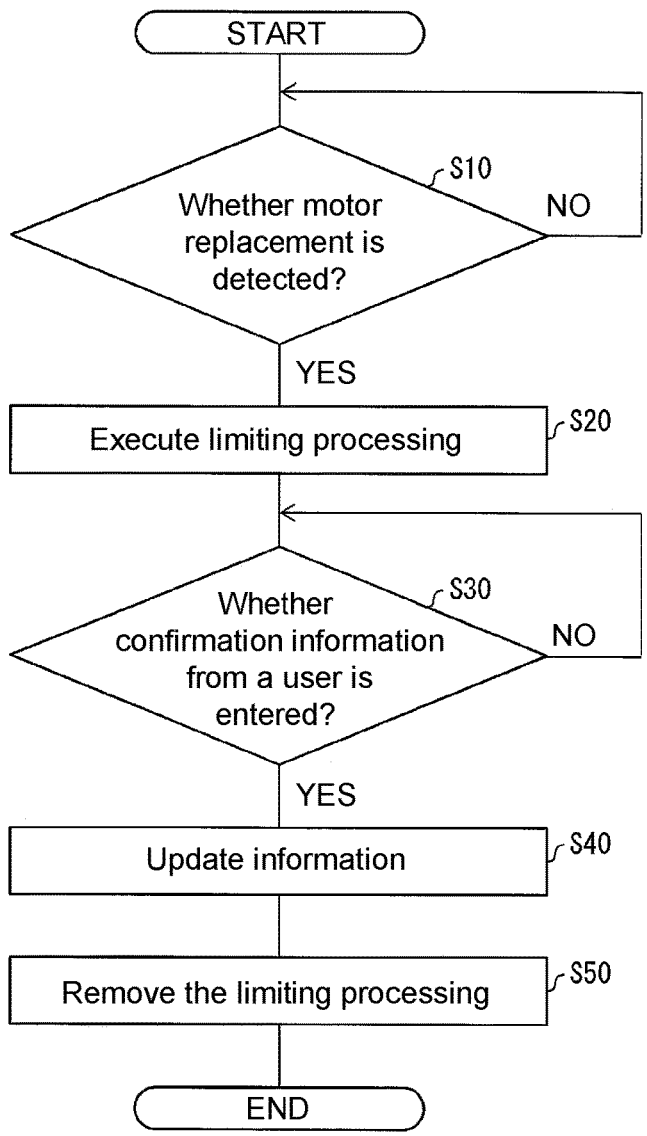
FIG. 3 is flowchart that illustrates a flow of processing executed by the motor control apparatus.

For an implementation manner of the present invention, the following description is made based on FIG. 1 to FIG. 3. In the present implementation manner, as a motor control apparatus, for example, the following motor control apparatus is described; the motor control apparatus uses a rotary motor carrying a batteryless absolute encoder as a control object, and performs positioning control on loading machinery connected to the motor. In addition, in the present implementation manner, the motor control apparatus is described. However, the motor control apparatus of the present invention is not necessarily limited thereto. For example, the present implementation manner can be applied to a motor control apparatus that performs control on a motor carrying an incremental encoder (incremental encoder) or a motor with battery-powered absolute encoder, or a motor control apparatus that performs control on a liner motor (liner motor) carrying a linear encoder (linear encoder). In addition, the present implementation manner can also be applied to a motor control apparatus that performs speed control or torque (torque) control on loading machinery.

In the following description, to easily understand a motor control apparatus 1A in a form of the present invention, first, an outline of a control system 10 that includes the motor control apparatus 1A is described by using FIG. 2.

(Outline of the Control System of Implementation Manner 1)

FIG. 2 is a diagram that illustrates the outline of the control system 10 that includes the motor control apparatus 1A. As shown in FIG. 2, the control system 10 includes: a tool (tool) personal computer (Personal Computer, PC) 20, the motor control apparatus 1A, a servo motor 30 that has a motor M and an encoder 31, loading machinery 32 driven by the motor M of the servo motor 30, and an upper controller 40.

The tool PC 20 is communicatably connected to the motor control apparatus 1A, and sets and adjusts various control parameters used by the motor control apparatus 1A. The tool PC 20, for example, performs implementation by using a personal computer. A user (user) of the control system 10 can set and adjust the control parameters by using software (software) stored in the personal computer, and can provide an instruction. The set or adjusted control parameters are forwarded from the tool PC 20 to the motor control apparatus 1A.

The motor control apparatus 1A controls driving of the motor M of the servo motor 30 according to the control parameters and based on location information, detected by the encoder 31 of the servo motor 30, of the motor M. Therefore, the motor control apparatus 1A controls driving of the loading machinery 32 by means of the driving of the motor M. That is, the motor control apparatus 1A performs feedback control on the motor M based on the location information, detected by the encoder 31, of the motor M.

The upper controller 40, for example, is a programmable logic controller (Programmable Logic Controller, PLC), and sends an instruction (a control signal) for driving control (for example, positioning control) of the servo motor 30 to the motor control apparatus 1A. Therefore, the upper controller 40 performs control of the motor control apparatus 1A.

An instruction for the motor control apparatus 1A, for example, not only can be performed by means of setting of the tool PC 20, but also can be performed by means of input from the upper controller 40. That is, the motor control apparatus 1A may also receive a control signal from the upper controller 40, and controls the servo motor 30 based on the received control signal. For example, the motor control apparatus 1A enables, based on the control signal, the servo motor 30 to drive, so that the motor M rotates by a specified amount at a specified rotation speed.

The motor control apparatus 1A is communicatably separately connected to the tool PC 20, the servo motor 30, and the upper controller 40, and a connection manner thereof is an arbitrary wired connection manner or a wireless connection manner. For example, the tool PC 20 is connected to the motor control apparatus 1A via an arbitrary communication cable (cable), specifically, the tool PC 20 may also be connected to the motor control apparatus 1A via a universal serial bus (Universal Serial Bus, USB) cable. In addition, the motor control apparatus 1A may also be connected to the servo motor 30, for example, via a dedicated cable. The motor control apparatus 1A may also be in communication and connected to the upper controller 40, for example, by using the Ethernet for control automation technology (Ethernet for Control Automation Technology, EtherCAT) (a registered trademark).

In the foregoing content, the outline of the control system 10 that includes the motor control apparatus 1A is described by using FIG. 2. Next, to easily understand the motor control apparatus 1A in a form of the present invention, a schematic description is made on types and characteristics of encoders generally carried on servo motors, and problems generated when motor replacement is performed are described.

(Types/Characteristics of Encoders and Problems Generated when Motor Replacement is Performed)

Even if an external power supply is off (OFF), a battery-powered absolute encoder still can keep motor location information by means of power supplied by a connected battery provided outside the encoder. However, in a case in which the battery is detached or a voltage of the battery decreases, the motor location information will be lost.

A motor carrying a battery-powered absolute encoder has, on a side of the encoder, information, about origin determining state, of whether an absolute location can be kept, where the information becomes origin undetermined state when there is no battery. The motor control apparatus reads the information about the origin undetermined state from the battery-powered absolute encoder, and gives an abnormal alarm, so as to notify location deviation. It also applies to a case in which the motor is replaced; a motor and an encoder that are newly connected to the motor control apparatus are in state where a first connection to the battery is not performed yet, and therefore the motor control apparatus naturally gives an abnormal alarm, so as to notify location deviation.

However, in a batteryless absolute encoder, as one type of absolute encoders, information about an absolute location of the motor is kept by means of machinery or magnetism. Therefore, the absolute location can be always kept without a battery. A result thereof: location deviation cannot be notified by means of the foregoing methods in the past. That is, in a case in which motor replacement is performed, the motor control apparatus does not give an abnormal alarm, and cannot notify location deviation.

According to characteristics of the foregoing past encoders whose outlines are described, in a case in which the invention disclosed in parent document 1 is applied during the motor replacement, the following problem may be generated.

That is, in a case in which a motor carrying a battery-powered absolute encoder is controlled, cases, for example, in which location deviation is not notified because a structure for automatically performing origin restoration operation is used may exist. Herein, in a case in which origin restoration cannot be accurately performed due to factors, for example, noise (noise), unexpected action may be performed when action after motor replacement is started.

In addition, in particular, in a motor carrying a batteryless absolute encoder, even if the motor is replaced, the motor control apparatus does not give an abnormal alarm, and therefore location deviation cannot be notified. A result thereof: if as stated in the past invention disclosed in patent document 1, motor information separately stored in the motor control apparatus and the encoder is automatically rewritten as inherent information of a motor after replacement to start control on the motor after the replacement, it is possible that unexpected action is performed when action is started.

In addition, in the disclosure of the present description, the so-called "location deviation" refers to deviation generated in a correspondence between motor location information recognized by the motor control apparatus and the location of the loading machinery as long as there is no particular disclosure. In other words, the "location deviation" refers to deviation generated between an actual location of the loading machinery and the location, recognized by the motor control apparatus, of the loading machinery. The expression "location deviation of the motor" refers to the same meaning. In addition, "state of location deviation" refers to state where location deviation is generated.

Next, the motor control apparatus of the present invention is described in detail. The motor control apparatus of the present invention can be used to control motors carrying various encoders, and can solve the foregoing problem.

(Detailed Conditions of the Motor Control Apparatus in a Form of the Present Invention)

A structure of the motor control apparatus 1A of the present implantation manner is described based on FIG. 1. FIG. 1 is a block diagram that illustrates a schematic structure of the motor control apparatus 1A and the control system 10 that includes the motor control apparatus 1A in the present implementation manner.

As shown in FIG. 1, the motor control apparatus 1A includes a control portion 2, a storage portion 3, a motor replacement detection portion 4, and an acceptance portion 5, and arbitrarily includes a notification portion 6 and a switching portion 7. In addition, a location where the storage portion 3 is provided is not limited to inside of the motor control apparatus 1A. The storage portion 3 may also be provided outside the motor control apparatus 1A.

The control system 10 that includes the motor control apparatus 1A includes the servo motor 30 configured outside the motor control apparatus 1A, the loading machinery 32 connected to the motor M of the servo motor 30, and an external device 50 that is communicatably connected to the acceptance portion 5. In addition, the control system 10 may also include a display portion 60 that is communicatably connected to the notification portion 6. In addition, the external device 50 may include the tool PC 20 and the upper controller 40. That is, a user may also enter information to the motor control apparatus 1A by using the tool PC 20 or the upper controller 40. In addition, the external device 50 not only may be a touch panel (touch panel), a button (button), or the like provided on the motor control apparatus 1A, but also may be another device.

The control portion 2 controls driving of the motor M of the servo motor 30 by using, for example, control parameters set and adjusted by the tool PC 20 or an instruction from the external device 50. In this case, the control portion 2 controls the driving the motor M based on motor location information detected by the encoder 31 of the servo motor 30, that is, information about an action condition of the motor M.

The encoder 31 of the servo motor 30 has information about the motor M, that is, connected motor information. The so-called "connected motor" herein refers to the motor M connected to the control portion 2. In addition, "connected motor information" is information for control of the connected motor, for example, control parameters of the connected motor or inherent attributes of the motor. In the present implementation manner, inherent identification information of the connected motor (motor identification information), that is, connected motor identification information is included. "Motor identification information" is information, for example, a form or sequence number of the motor, that uniquely determines a motor individual. The connected motor identification information, for example, is a motor identification (ID).

Therefore, before and after replacement of the servo motor 30, the connected motor information owned by the encoder 21 is different. The connected motor information is stored in a non-volatile memory (not shown), for example, a flash memory (flash memory), provided in the encoder 31. In addition, a storage medium that stores the information is not particularly limited, and this also applies to the following disclosure.

In addition, in the present implementation manner, the encoder 31, for example, is a batteryless absolute encoder. However, in the control system 10 that includes the motor control apparatus 1A of the present invention, the encoder 31 may also be an incremental encoder or a battery-powered absolute encoder.

The storage portion 3 stores at least control object motor information. In the present implementation manner, the storage portion 3 further stores motor usage information. Details of the motor usage information are described subsequently. The control object motor information and the motor usage information are stored in a non-voltage memory, for example, a flash memory, as the storage portion 3. The "control object motor" herein refers to a motor used by the motor control apparatus as the control object. "Control object motor information" refers to information used for controlling of the control object motor, for example, control parameters of the control object motor or inherent attributes of the motor. In the present implementation manner, "control object motor information" includes inherent identification information of the control object motor, that is, control object motor identification information.

The motor replacement detection portion 4 detects replacement of the motor M in a case in which the motor M is replaced. A specific detection method of the replacement of the motor M is described subsequently.

Herein, in the motor control method disclosed in the past patent document 1, in a case in which motor replacement is detected, inherent information, separately stored in the motor control apparatus and the encoder, of the motor is automatically rewritten as information of the motor after the replacement, so as to control the motor after the replacement. The control method has the following problem: in a case in which location deviation occurs to the motor after the replacement, the motor may perform unexpected action when starting action.

In particular, as in the present implementation manner, in a case in which the encoder 31 is a batteryless absolute encoder, because an absolute location can be always kept, even if motor replacement is performed, an abnormal alarm is not given. Or even if in a case in which the encoder 31 is a battery-powered absolute encoder, however, if in a control system that automatically performs origin restoration operation after motor replacement, a problem exists in a case in which the origin restoration is not normally performed due to reasons, for example, noise.

Therefore, the motor control apparatus 1A of the present implementation manner has the following feature. Therefore, the following motor control can be implemented: when replacement of a motor as a control object is performed, a motor after the replacement can be enabled to perform action in state of ensuring security.

That is, in a case in which the motor replacement detection portion 4 detects motor replacement, the motor control apparatus 1A of the present implementation manner sends a motor replacement detection signal to the control portion 2; when receiving the motor replacement detection signal, the control portion 2 executes limiting processing for limiting action of the motor M after the replacement.

In addition, the acceptance portion 5 of the motor control apparatus 1A of the present implementation manner accepts, from a user, input of confirmation information of a confirmed intention of the replacement of the motor, and sends the input information to the control portion 2. The limiting processing lasts at least until the acceptance portion 5 accepts the input of the confirmation information. The acceptance portion 5, for example, can perform communication with the external device 50, so as to accept, from the user, the input of the confirmation information to the external device 50. In addition, a terminal for entering the confirmation information by the user is not necessarily limited to the external device 50.

Therefore, in a case in which motor replacement is performed, action of the motor M after the replacement is limited at least until the acceptance portion 5 accepts, from the user, the input of the confirmation information.

Detailed description is made on "limiting processing for limiting action of the motor M after the replacement", "motor replacement detection", and "confirmation information input by a user" below.

(Limiting Processing for Limiting Action of the Motor after the Replacement)

The limiting processing includes: at least one of processing of making, from outside, an instruction for the control portion 2 become invalid, processing of forbidding outputting a drive signal to the motor M, or processing of inhibiting an output value of the drive signal for the motor M. The processing of making, from outside, an instruction for the control portion 2 become invalid is processing that the acceptance portion 5 that accepts instructions from the external device 50, for example, the tool PC 20 or the upper controller 40 sets the instructions invalid. In addition, the processing of forbidding outputting a drive signal to the motor M is processing of blocking a process of entering a motor drive signal operated by the control portion 2 of the motor control apparatus 1A to the motor M. In this case, not only the motor drive signal operated by the control portion 2 can be blocked, but also an output current output by an output circuit (not shown) provided in the motor control apparatus 1A based on the motor drive signal can be blocked. In addition, the processing of inhibiting an output value of the drive signal for the motor M is described below, and is processing of limiting a speed and an acceleration of the motor by inhibiting the output value of the drive signal for the motor M.

The processing of making, from outside (for example, the external device 50), an instruction for the control portion 2 become invalid, or the processing of forbidding outputting a drive signal to the motor M is performed by means of the control portion 2, so as to prevent the motor M after the replacement from performing action. Therefore, the following condition does not occur: the motor M performs unexpected action in state of location deviation, resulting in that damages occur to the motor M or the loading machinery 32.

Or the processing of inhibiting an output value of the drive signal for the motor M is performed by means of the control portion 2, so as to limit an action speed of the motor M. Therefore, even if the motor M performs action, the action can be enabled to be slow. Therefore, even if the loading machinery 32 performs action in state where location deviation occurs, the probability that damages occur to the motor M and the loading machinery 32 can also be reduced. In addition, the control portion 2 may also enable the motor M to perform action slowly, so as to securely perform origin restoration operation of the loading machinery 32.

By means of such limiting processing, even if in state of location deviation after the replacement of the motor M, the probability that damages occur to the motor M or the loading machinery 32 due to unexpected action can also be reduced, so as to ensure security.

In addition, for example, an instruction sent from the external device 50 to the control portion 2 may include an instruction of obtaining current location information or control parameters of the motor M. Such an instruction irrelevant with the action of the motor M does not need to be particularly limited. Therefore, the limiting processing may also include processing of enabling an instruction of a specific type in multiple instructions for the control portion 2 not to be executed from the outside. The multiple instructions are, in particular, instructions including a command enabling the motor to perform action. For example, an instruction that performs trial operation action or frequency attribute analysis of the motor M may be listed.

By means of the foregoing limiting processing, action of the motor M after the replacement is limited. In addition, the limiting processing may also include processing other than the processing.

(Motor Replacement Detection)

The limiting processing is executed when the motor replacement detection portion 4 detects replacement of the motor M. In the present implementation manner, the motor replacement detection portion 4 obtains connected motor identification information from an encoder 31 of the connected servo motor 30, and compares whether the obtained connected motor identification information is consistent with control object motor identification information, and in a case in which the obtained connected motor identification information is inconsistent with the control object motor identification information, the motor replacement detection portion 4 detects a condition of replacement of the motor M.

The motor identification information is one-to-one corresponding to motors. Therefore, replacement of the motor M can be detected more practically according to an operation of detecting replacement of the motor M based on inherent motor identification information of the motor.

In addition, the motor replacement detection portion 4, for example, may also obtain the control object motor information from the storage portion 3, and compares the obtained control object motor information with the connected motor information of the encoder 31, so as to detect replacement of the motor M. In addition, for example, in a case in which the encoder 31 is a battery-powered absolute encoder, the motor replacement detection portion 4 may also detect slip-off of a battery line to detect replacement. A method for detecting replacement of the motor M in the motor replacement detection portion 4 is not particularly limited.

(Confirmation Information Input by a User)

In the motor control apparatus 1A of the present implementation manner, the limiting processing lasts until the acceptance portion 5 accepts, from the user, the input of the confirmation information of the confirmed intention of the replacement of the motor. The input of the confirmation information is described below.

In the present implementation manner, the input of the confirmation information is performed by entering the connected motor identification information of the motor M after the replacement to the external device 50. On such basis, the user needs to enter a motor identification (ID) only, and can perform the input (ID setup (setup)) in a relatively simple manner. The acceptance portion 5 compares whether the entered connected motor identification information is consistent with the connected motor identification information of the encoder 31 after the replacement; in a case in which the entered connected motor identification information is consistent with the connected motor identification information of the encoder 31 after the replacement, the control object motor information of the storage portion 3 is updated by using the connected motor information obtained from the encoder 31 after the replacement. In addition, update of the control object motor information of the storage portion 3 may also be performed by means of the motor identification entered by the user.

That is, when the acceptance portion 5 accepts, from the user, input of an update indication of the control object motor information as the confirmation information, the control object motor information of the storage portion 3 is updated by using the connected motor information obtained from the encoder 31 after the replacement. Or the control object motor information of the storage portion 3 is updated by using the motor identification entered by the user. On such basis, the user is simply queried about whether the motor is replaced, which can reduce the probability of entering the confirmation information by mistake by the user.

In addition, the input of the confirmation information may also be performed in the following manner: display of whether the motor has been replaced is queried on the external device 50, and the user selects yes (YES) or no (NO). In addition, the input of the confirmation information may also be performed in the following manner: display of detected motor replacement is performed on the external device 50, and the user simply enters input confirmation (OK) thereto. In addition, the input of the confirmation information may also be performed in the following manner: the connected motor identification information obtained by the motor replacement detection portion 4 is displayed on the external device 50, and the user enters confirmation (OK). When the user enters yes (YES) or confirmation (OK) as the confirmation information, the acceptance portion 5 updates the control object motor information of the storage portion 3 as the connected motor information obtained from the encoder 31 after the replacement. According to the manners, the user can perform input of the confirmation information in a relatively simple manner.

In this way, the acceptance portion 5 accepts, from the user, the input of the confirmation information of the confirmed intention of the replacement of the motor. Herein, before the user performs the input of the confirmation information, the user must perform origin reset processing, for example, origin restoration, to eliminate location deviation. Herein, the so-called "origin reset processing" in the present description, for example, refers to the following processing: enabling the loading machinery 32 to move to an origin location (origin restoration); or entering a distance (a location offset) between the loading machinery 32 and the origin location to the motor control apparatus as an offset (offset), to eliminate location deviation. That is, the origin reset processing only requires processing of eliminating location deviation of the motor, and can be performed by using any method known by a person skilled in the art.

According to the motor control apparatus 1A having the foregoing structure of the present implementation manner, in a case in which the replacement of the motor is performed, the user must confirm the replacement of the motor and enter the confirmation information, and therefore after the user can confirm security, that is, confirm whether control on the motor M can be started, the user enters the confirmation information to the acceptance portion to start control on the motor M.

In addition, the user confirms state of the motor M after the replacement, and when location deviation of the motor exists, the user can enter the confirmation information to the acceptance portion after origin reset processing, for example, origin restoration is performed. A result thereof: the motor M after the replacement can be prevented from performing unexpected action when action is started.

Therefore, a motor control apparatus can be provided, which can enable the motor M after the replacement to perform action in state of ensuring security of the motor M after the replacement.

In the foregoing content, a main structure of the motor control apparatus 1A of the present implementation manner is described. An auxiliary structure of the motor control apparatus 1A is described below. Specifically, the notification portion 6 that notifies detection of motor replacement and a switching portion 7 that switches between execution and non-execution of limiting processing according to motor usage are described. In addition, the notification portion 6 and the switching portion 7 are not necessary structures, and may also be omitted.

(Notification Portion)

A motor replacement detection signal from the motor replacement detection portion 4 is also sent to the notification portion 6. When receiving the motor replacement detection signal, the notification portion 6 notifies abnormal information of the intention of the replacement of the motor. In the present implementation manner, the notification is performed by means of display of the display portion 60. The display, for example, not only may be lightening of a lamp (lamp) as the display portion 60, but also may be information display on an image of the display portion 60. In addition, the notification may also be notification by means of sound. That is, a method for notifying abnormal information by the notification portion 6 is not particularly limited.

In addition, the display portion 60 not only may be provided independent from the external device 50, but also may be integral with the external device 50. For example, notification may also be performed by displaying the abnormal information on an image of the external device 50.

Therefore, the user can easily recognize, according to the notified abnormal information, the condition of the replacement of the motor and the condition that the action of the motor is limited. In addition, the user can easily recognize that the confirmation information must be entered and location deviation must be eliminated.

(Switching Portion)

The switching portion 7 can switch the control portion 2 between execution or non-execution of the limiting processing. In a case in which usage of the motor M connected to the control portion 2 is an increment type, the switching portion 7 enables the control portion 2 not to execute the limiting processing. Information about the usage of the motor M, that is, motor usage information, is pre-entered by using the external device 50 and stored in the storage portion 3 by the user.

The switching portion 7 obtains the motor usage information from the storage portion 3, and in a case in which the motor usage information indicates usage of the increment type, the switching portion 7 enables the control portion 2 not to execute the limiting processing.

Herein, the usage of the motor M is the increment type, for example, a case in which the loading machinery 32 connected to the motor M is a conveyer (conveyer) and the like that continuously rotate towards a fixed direction. That is, a case in which the motor control apparatus 1A does not perform positioning control of the loading machinery 32, instead, performs speed control or torque control. In this case, origin reset processing, for example, origin restoration does not need to be performed, and therefore when motor replacement is performed, as stated above, the probability that the motor after the replacement performs unexpected action is small. In addition, even if in a case in which the usage of the motor M is the increment type, positioning control is still performed sometimes. However, in this case, during start-up of the apparatus, origin reset processing is generally performed each time. That is, whether the motor is replaced or not, origin reset processing originally needs to be performed each time the apparatus is started, and therefore, as stated above, the probability that the motor after the replacement performs unexpected action is small. Therefore, in a case in which usage of the motor M is the increment type, the switching portion 7 enables the control portion 2 not to execute the limiting processing. Therefore, the user does not need extra work, so as to improve convenience.

In addition, in a case in which the encoder 31 is an incremental encoder, motor usage information only needs to indicate the usage of the increment type. Therefore, the limiting processing is not executed, and the user does not need extra work.

In addition, the switching portion 7 may also have the following structure.

That is, the switching portion 7, for example, may also be a button or a switch provided on the motor control apparatus 1A, and execution of the limiting processing by the control portion 2 is switched to be valid or invalid by using the button or switch. On such basis, the storage portion 3 does not need to be enabled to store the motor usage information, and execution or non-execution of the limiting processing can be switched easily.

The foregoing content describes detailed conditions of the structure of the motor control apparatus 1A. Next, a flow of processing executed by the motor control apparatus 1A is described by using FIG. 3.

(Processing Executed by the Motor Control Apparatus in a Form of the Present Invention)

FIG. 3 is flowchart that illustrates a flow of processing executed by the motor control apparatus 1A of the present implementation manner. In the flowchart, description is made on general processing, in state of controlling the motor M and is relevant with motor replacement, performed by the motor control apparatus 1A.

As shown in FIG. 3, the motor control apparatus 1A first enables the motor replacement detection portion 4 to detect whether the motor has been replaced (S10).

In a case in which the motor replacement detection portion 4 does not detect motor replacement (no in S10), the motor control apparatus 1A continues to perform general control on the servo motor 30, and executes processing of S10 again.

In a case in which the motor replacement detection portion 4 detects motor replacement (yes in S10), the motor control apparatus 1A enables the control portion 2 to execute limiting processing for limiting action of the motor M after the replacement (S20). In this case, the notification portion 6 notifies abnormal information. In addition, the switching portion 7 switches the control portion 2 between execution and non-execution of limiting processing based on motor usage information. In a case in which the motor usage information is not the increment type, the control portion 2 executes limiting processing, and the flowchart proceeds to the next step.

Next, the motor control apparatus 1A enables the acceptance portion 5 to accept whether confirmation information from a user is entered (S30).

In a case in which the acceptance portion 5 does not receive input of the confirmation information from the user (no in S30), the motor control apparatus 1A enables the control portion 2 to continue the limiting processing, and execute processing of S30 again.

In a case in which the acceptance portion 5 receives the input of the confirmation information from the user (yes in S30), the acceptance portion 5 updates the control object motor information of the storage portion 3 as the connected motor information obtained from the encoder 31 after the replacement (S40).

Next, the motor control apparatus 1A enables the control portion 2 to remove limiting processing (S50). In this case, the notification portion 6 stops notifying abnormal information.

Subsequently, the motor control apparatus 1A performs general control on the motor M.

The motor control method executed by the motor control apparatus 1A may be sorted, as stated below. That is, the motor control method executed by the motor control apparatus 1A is to perform control on the motor M, where the motor control method includes: a motor replacement detection step: detecting a condition of replacement of the motor M; and an action limiting step: when the replacement of the motor M is detected in the motor replacement detection step, limiting action of the motor M after the replacement, at least until input of confirmation information of a confirmed intention of the replacement of the motor M is accepted from a user.

According to the structure, in a case in which the replacement of the motor M is detected in the motor replacement detection step, according to the motor control method, the action limiting step for limiting the action of the motor M after the replacement is started. The action limiting step lasts at least until the input of the confirmation information of the confirmed intention of the replacement of the motor M is accepted from the user. Therefore, after the user can confirm security, that is, confirm whether control on the motor M can be started, the user enters the confirmation information to start control on the motor M. Therefore, the motor control method achieves the following effect: when the replacement of the motor M as the control object is performed, the motor M after the replacement can be enabled to perform action in state of ensuring security.

[Implementation Manner 2]

Figure 4:
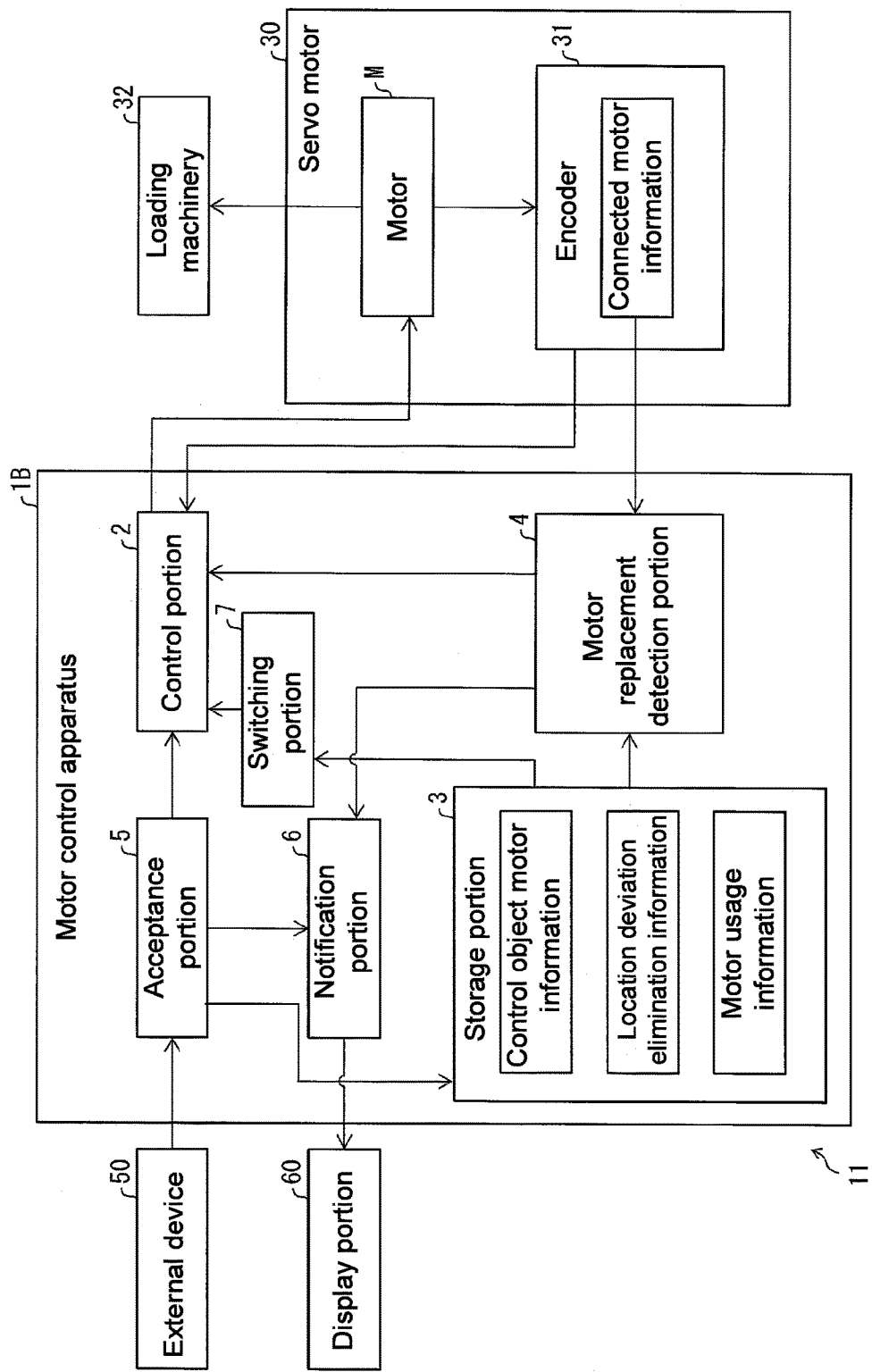
FIG. 4 is a block diagram that illustrates a schematic structure of a motor control apparatus and a control system that includes the motor control apparatus in implementation manner 2 of the present invention.
Figure 5:
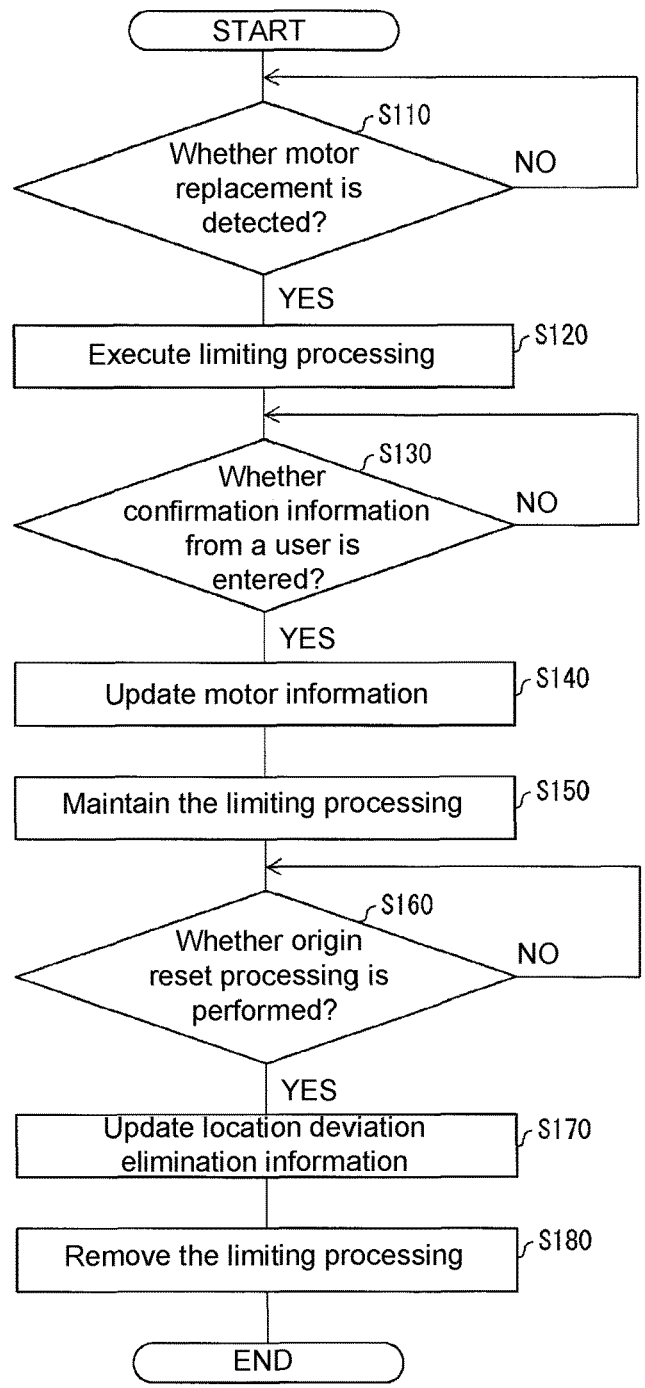
FIG. 5 is flowchart that illustrates a flow of processing executed by the motor control apparatus.

For another implementation manner of the present invention, the following description is made based on FIG. 4 and FIG. 5. In addition, structures other than the structure described in the present implementation manner are the same as those of the implementation manner 1. In addition, to facilitate description, means having functions the same as those of the means shown in the accompanying drawings of the implementation manner 1 are marked with same symbols and descriptions thereof are omitted.

In the motor control apparatus 1A and the control system 10 that includes the motor control apparatus 1A in the implementation manner 1, the control portion 2 executes limiting processing, at least until input of confirmation information of a confirmed intention of replacement of the motor M is accepted from a user. On the contrary, in a motor control apparatus 1B and a control system 11 that includes the motor control apparatus 1B in the present implementation manner, a difference lies in that: a storage portion 3 stores information about whether location deviation of a motor M has been eliminated and about a location deviation condition, that is, location deviation elimination information; a control portion 2 executes limiting processing based on the location deviation elimination information, at least until location deviation of the motor M is eliminated.

(Detailed Conditions of the Motor Control Apparatus in a Form of the Present Invention)

A structure of the motor control apparatus 1B of the present implantation manner is described based on FIG. 4. FIG. 4 is a block diagram that illustrates a schematic structure of the motor control apparatus 1B and the control system 11 that includes the motor control apparatus 1B in the present implementation manner.

As shown in FIG. 4, the storage portion 3 of the motor control apparatus 1B of the present implementation manner stores the location deviation elimination information. The so-called "location deviation elimination information" refers to the following.

That is, the location deviation elimination information is "eliminated" in a case in which the motor does not generate location deviation and the motor control apparatus 1B performs general control on the motor M. Because origin undermined state occurs (location deviation is generated) due to replacement of the motor M, the location deviation elimination information is overwritten as "uneliminated".

Subsequently, when origin reset processing of the motor M is completed, the location deviation elimination information is overwritten as "eliminated". In addition, indication of "location deviation elimination information" is not limited to "eliminated" and "uneliminated". For example, "location deviation elimination information" may also be indicated by using "location offset" in the origin undetermined state. "Location deviation elimination information" is exemplarily indicated as "eliminated" and "uneliminated" for description below.

In a case in which the motor control apparatus 1B of the present implementation manner detects motor replacement, as stated above, the location deviation elimination information becomes "uneliminated". In addition, the motor control apparatus 1B continues to perform limiting processing of the control portion 2, at least until the location deviation elimination information becomes "eliminated". That is, the motor control apparatus 1B of the present implementation manner does not remove the limiting processing of the control portion 2 in a phase when an acceptance portion 5 accepts, from a user, an input of confirmation information of a confirmed intention of replacement of the motor.

For this point, in other words, the motor control apparatus 1B executes the limiting processing, at least until origin reset processing is performed.

The origin reset processing, for example, may be performed by enabling loading machinery 32 to move to an origin location, that is, by means of origin restoration. The origin restoration, for example, may also be performed by manually moving the loading machinery 32 by the user. In this case, preferably, the user performs an input of an intention of the origin reset processing on an external device 50 after the origin restoration. In addition, the origin restoration may also be performed by entering an instruction of automatic restoration operation to the motor control apparatus 1B by the user.

Or the origin reset processing, for example, may also be performed by entering an origin location offset, as a distance (location offset) between the loading machinery 32 and the origin location to the external device 50 by the user.

Or the origin reset processing, for example, may also be performed by automatic origin restoration operation by the loading machinery 32 in a case in which motor replacement is detected. However, in this case, preferably, the user performs an input for accepting that the origin reset processing has been completed on the external device 50.

According to the motor control apparatus 1B having this structure of the present implementation manner, the control portion 2 not only performs the input of the confirmation information of the confirmed intention of the replacement of the motor, but also continues to perform the limiting processing, until the origin reset processing of the motor is performed to eliminate location deviation of the motor. Therefore, the probability of performing action by the motor in state where location deviation occurs is reduced. A result thereof: the motor after the replacement can be prevented from performing unexpected action when action is started, resulting in that damages occur to the motor or the loading machinery 32.

In addition, the sequence of entering the confirmation information and the origin reset processing of the motor is not limited, and either one may be performed first. Therefore, the content may be sorted, as stated below. That is, in a case in which a motor replacement detection portion 4 detects motor replacement, the control portion 2 of the motor control apparatus 1B executes the limiting processing, until the acceptance portion 5 accepts, from the user, the input of the confirmation information of the confirmed intention of the motor replacement and the origin reset processing of the motor is completed.

Herein, preferably, as stated above, the origin reset processing accompanies some user operations. In this case, the user must actively perform the input of the confirmation information and the origin reset processing. Therefore, the probability of performing action by the motor in state where location deviation occurs is extremely reduced.

Therefore, a motor control apparatus can be provided, which can enable the motor after the replacement to perform action in state of further ensuring security when the motor as a control object is replaced.

In addition, a notification portion 6 first notifies abnormal information in a case in which motor replacement is detected. Then, when the user performs the input of the confirmation information, the notification portion 6 stops notifying the abnormal information. On the other aspect, in a case in which the origin location of the motor M is unclear, the notification portion 6 notifies alarm information that indicates an intention thereof. Subsequently, after the origin reset processing is performed, the notification portion 6 stops notifying the alarm information. In this way, the notification portion 6 performs two-phase notification.

Therefore, when the user performs the input of the confirmation information of the confirmed intention of the replacement of the motor, the user can further recognize that origin deviation of the motor must be eliminated. A result thereof: the user can be urged to practically perform elimination of the motor location deviation. In addition, the user can accurately master current conditions.

In addition, notification of the abnormal information or alarm information may also be separately performed by means of a number displayed on a display portion 60, and a notification method of the notification portion 6 is not particularly limited.

The foregoing content describes detailed conditions of the structure of the motor control apparatus 1B. Next, a flow of processing executed by the motor control apparatus 1B is described by using FIG. 5.

(Processing Executed by the Motor Control Apparatus in a Form of the Present Invention)

FIG. 5 is flowchart that illustrates a flow of processing executed by the motor control apparatus 1B of the present implementation manner. In the flowchart, description is made on general processing, in state of controlling the motor M and is relevant with motor replacement, performed by the motor control apparatus 1B.

As shown in FIG. 5, the motor control apparatus 1B first enables the motor replacement detection portion 4 to detect whether the motor has been replaced (S110).

In a case in which the motor replacement detection portion 4 does not detect motor replacement (no in S110), the motor control apparatus 1B continues to perform general control on a servo motor 30, and executes processing of S110 again.

In a case in which the motor replacement detection portion 4 detects motor replacement (yes in S110), the motor control apparatus 1B enables the control portion 2 to execute limiting processing for limiting action of the motor after the replacement (S120). In this case, the motor control apparatus 1B sets the location deviation elimination information stored in the storage portion 3 as uneliminated. In this case, the notification portion 6 notifies abnormal information. In addition, a switching portion 7 switches the control portion 2 between execution and non-execution of limiting processing based on motor usage information. In a case in which the motor usage information is not an increment type, the control portion 2 executes limiting processing, and the flowchart proceeds to the next step.

Next, the motor control apparatus 1B enables the acceptance portion 5 to accept whether confirmation information from a user is entered (S130).

In a case in which the acceptance portion 5 does not receive input of the confirmation information from the user (no in S130), the motor control apparatus 1B enables the control portion 2 to continue the limiting processing, and execute processing of S130 again.

In a case in which the acceptance portion 5 receives the input of the confirmation information from the user (yes in S130), the acceptance portion 5 updates control object motor information of the storage portion 3 as connected motor information obtained from an encoder 31 after the replacement (S140).

Next, in the motor control apparatus 1B of the present implementation manner, the control portion 2 maintains limiting processing (S150). In this case, the notification portion 6 ends notification of the abnormal information, and on the other aspect, notifies alarm information of an intention that location deviation occurs to the motor.

Subsequently, the motor control apparatus 1B enables the acceptance portion 5 to accept whether information from the user is entered for origin reset processing (S160). Herein, the origin reset processing may the following processing. That is, the user may also enter origin reset completed to the external device 50 after the loading machinery 32 is moved to the origin location by means of automatic restoration operation or manually by the user. Or the user may also enter a difference (origin location offset) between a current location and the origin location of the loading machinery 32 to the external device 50.

In a case in which the origin reset processing based on an indication of the user is not completed (no in S160), the motor control apparatus 1B enables the control portion 2 to continue the limiting processing, and execute processing of S160 again.

In a case in which the origin reset processing based on the indication of the user is completed (yes in S160), the motor control apparatus 1B updates the location deviation elimination information of the storage portion 3 as "eliminated" (S170).

Next, the motor control apparatus 1B enables the control portion 2 to remove limiting processing (S180). In a case in which the notification portion 6 continuously notifies the alarm information, in this case, the notification portion 6 stops notifying the alarm information.

Subsequently, the motor control apparatus 1B performs general control on the motor M.

The motor control method executed by the motor control apparatus 1B may be sorted, as stated below. That is, the motor control method executed by the motor control apparatus 1B is to perform control on the motor M, where the motor control method includes: a motor replacement detection step: detecting a condition of replacement of the motor M; an action limiting step: when the replacement of the motor M is detected in the motor replacement detection step, limiting action of the motor M after the replacement; and a location deviation elimination detection step: detecting conditions of completion of the origin reset processing on the motor M and location deviation elimination, where action limitation on the motor M lasts at least until location deviation detected in the location deviation elimination detection step is eliminated.

According to the structure, in the motor control method, the action limiting step lasts until location deviation detected in the location deviation elimination detection step is eliminated. Therefore, control on the motor M can be started after location deviation of the motor M is eliminated. Therefore, the motor control method achieves the following effect: when the replacement of the motor M as the control object is performed, the motor M after the replacement can be enabled to perform action in state of further ensuring security.

[Implementation Manner 3]

Figure 6:
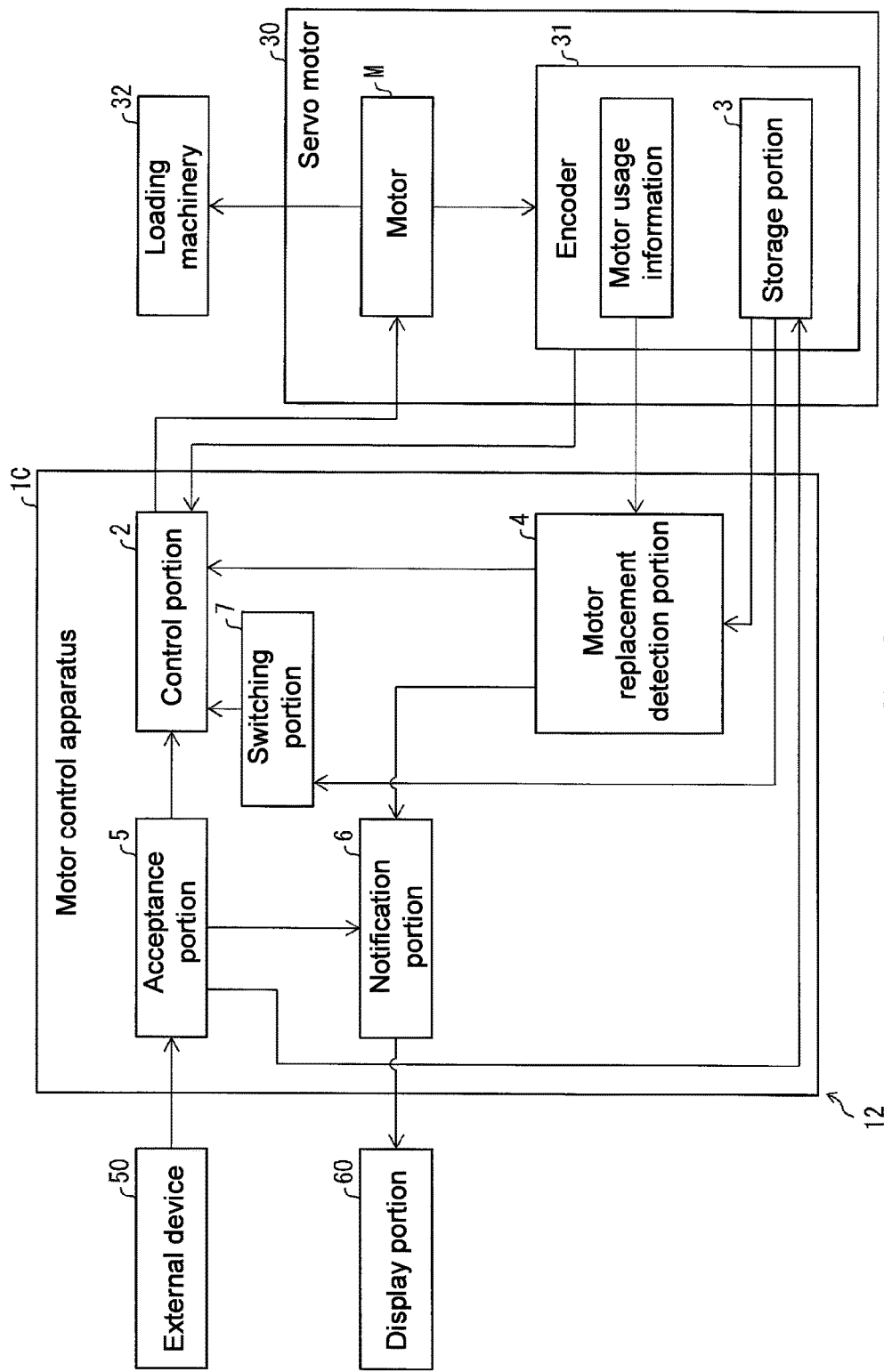
FIG. 6 is a block diagram that illustrates a schematic structure of a motor control apparatus and a control system that includes the motor control apparatus in implementation manner 3 of the present invention.

For another implementation manner of the present invention, the following description is made based on FIG. 6. In addition, structures other than the structure described in the present implementation manner are the same as those of the implementation manner 1 and the implementation manner 2. In addition, to facilitate description, means having functions the same as those of the means shown in the accompanying drawings of the implementation manner 1 and the implementation manner 2 are marked with same symbols and descriptions thereof are omitted.

Regarding the motor control apparatus 1A/1B of the implementation manner 1 and the implementation manner 2, the motor control apparatus 1A/1B includes a storage portion 3. On the contrary, in a control system 12 that includes a motor control apparatus 1C of the present implementation manner, a difference lies in that, a storage portion 3 is included in a servo motor 30 or an encoder 31.

In the control system 12 that includes the motor control apparatus 1C of the present implementation manner, the servo motor 30 or encoder 31 includes the storage portion 3. The storage portion 3 stores at least control object motor information, preferably, further stores motor usage information and location deviation elimination information.

A motor replacement detection portion 4 can obtain the information from the storage portion 3 of the servo motor 30 or the encoder 31, to detect replacement of the motor.

In this structure, when the servo motor 30 is replaced, both a motor M and the encoder 31 are replaced. Therefore, in the storage portion 3 after the replacement, the information is not stored just after the replacement is performed.

Therefore, in a case in which information obtained from the storage portion 3 is 0 (null (NULL)), the motor replacement detection portion 4 detects motor replacement. On such basis, the replacement of the motor can be detected more easily and practically.

In addition, even if in a case in which the storage portion of the motor or encoder after the replacement pre-stores control object motor information, when the control object motor information obtained from the motor or encoder after the replacement is inconsistent with connected motor information, it is detected that the motor has been replaced. On such basis, the replacement of the motor can be detected more easily and practically.

[Implementation Manner 4]

Figure 7:
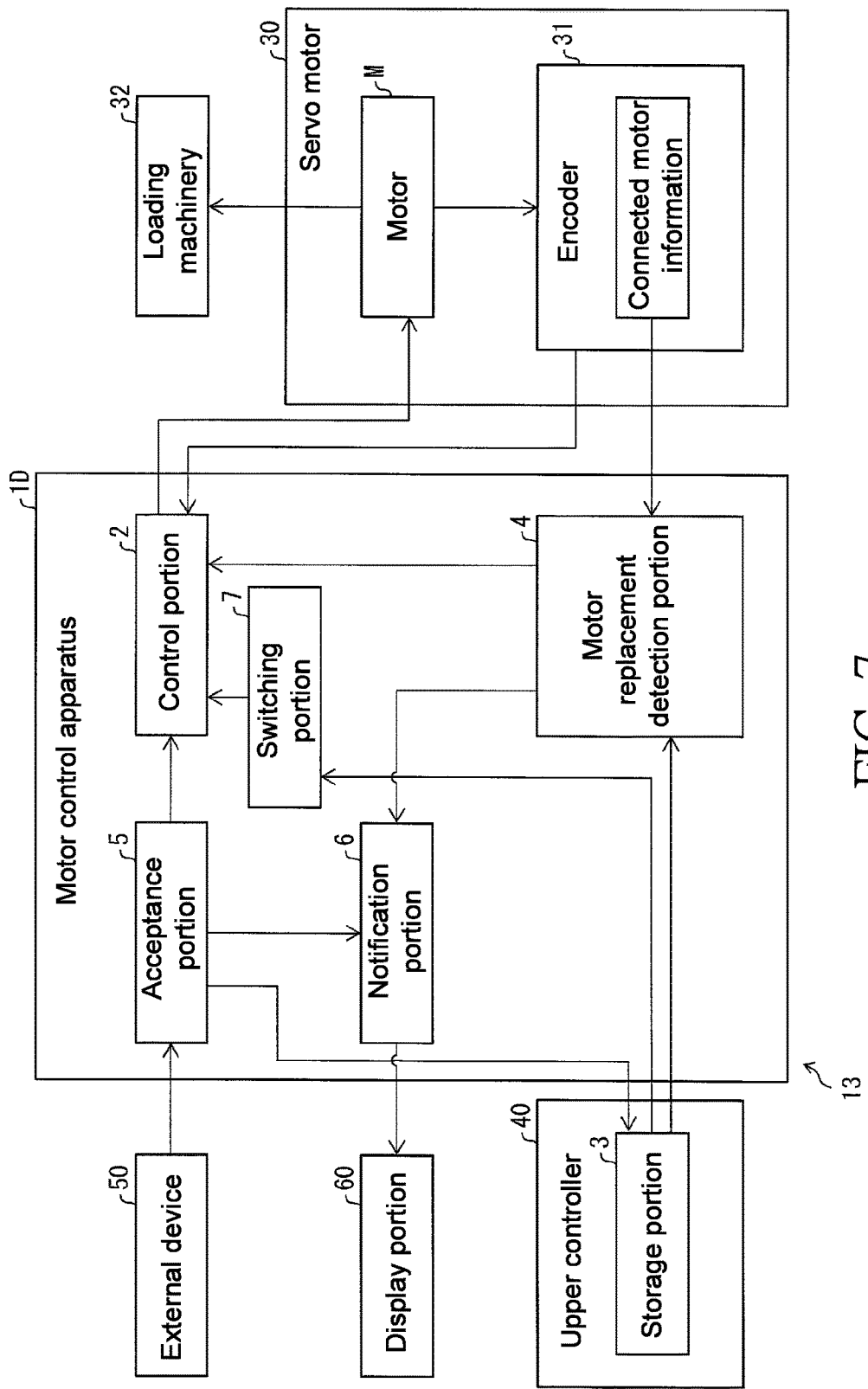
FIG. 7 is a block diagram that illustrates a schematic structure of a motor control apparatus and a control system that includes the motor control apparatus in implementation manner 4 of the present invention.
Figure 8:
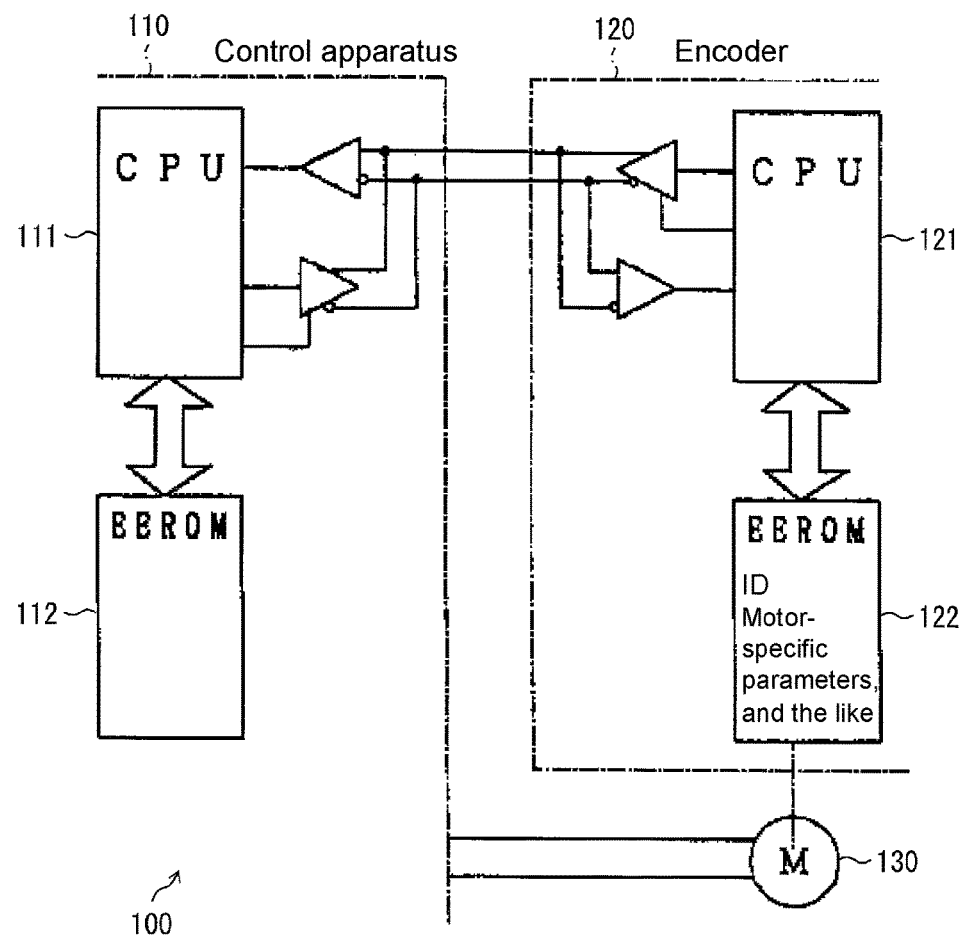
FIG. 8 is a block diagram that illustrates a schematic structure of a control system of a motor control method in the past.

For another implementation manner of the present invention, the following description is made based on FIG. 7. In addition, structures other than the structure described in the present implementation manner are the same as those of the implementation manner 1 to implementation manner 3. In addition, to facilitate description, means having functions the same as those of the means shown in the accompanying drawings of the implementation manner 1 to implementation manner 3 are marked with same symbols and descriptions thereof are omitted.

In the motor control apparatus 1C of the implementation manner 3, the storage portion 3 is included in the servo motor 30 or the encoder 31. On the contrary, in a control system 13 that includes a motor control apparatus 1D of the present implementation manner, a difference lies in that, a storage portion 3 is included in an upper controller 40.

The control system 13 that includes the motor control apparatus 1D of the present implementation manner includes the upper controller 40 provided outside the motor control apparatus 1D. The upper controller 40 is connected to at least a motor replacement detection portion 4.

The storage portion 3 is provided in the upper controller 40. The storage portion 3 stores at least control object motor information, preferably, further stores motor usage information and location deviation elimination information.

The motor replacement detection portion 4 can obtain the information from the storage portion 3 of the upper controller 40, to detect replacement of a motor.

In this structure, for example, even if in a case in which the motor control apparatus 1D is replaced, the motor control apparatus 1D after the replacement can also obtain motor information from the upper controller 40 and an encoder 31, to perform control on a motor M. Therefore, even if a failure occurs to the motor control apparatus 1D, the motor control apparatus 1D can also be replaced to easily continue control on the motor M.

[Implementation Example by Means of Software]

Control blocks (block) of the motor control apparatus 1A to the motor control apparatus 1D not only may be implemented by means of a logic circuit (hardware (hardware)) formed on an integrated circuit (IC chip (chip)) and the like, but also may be implemented by using a CPU (Central Processing Unit) by means of software.

In the latter situation, the motor control apparatus 1A to the motor control apparatus 1D have a CPU that executes a command for implementing software with various functions, that is, programs, a read only memory (Read Only Memory, ROM) or a storage apparatus (called "recording media") that can be read by a computer (or CPU) and records the programs and various data, a random access memory (Random Access Memory, RAM) that expands the programs, and the like. Moreover, the programs are read from the recording media and executed by using a computer (or CPU), so as to achieve the objective of the present invention. As the recording media, "non-temporary tangible media" may be used, for example, a tape (tape), a disk (disk), a card (card), a semiconductor memory, and a programmable logic circuit may be used. In addition, the programs may also be provided for the computer via any transmission medium (a communication network, a broadcast wave, or the like) that can transmit the programs. In addition, the present invention can also implement a form of data signals, instantiated and embedded in a carrier of the programs, by means of electronic transmission.

The present invention is not limited to the implementation manners, and various modifications may be performed within a scope shown in the claims; an implementation manner obtained by suitably combining technical components respectively disclosed in different implementation manners also falls into the technical scope of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motor control apparatus, which performs motor control, wherein the motor control apparatus comprises:
   a control circuit, coupled to the motor, configured to control and limit action of the motor;
   a motor replacement detection circuit, coupled to the control circuit and the motor, configured to detect whether a replacement of the motor by a replacement motor has occurred;
   a switching circuit, coupled to the control circuit, configured to obtain usage information of the motor to determine whether an encoder of the motor is an incremental encoder or a non-incremental encoder and switch the control circuit between executing and not executing a limiting processing; and
   an acceptance circuit, coupled to the control circuit, configured to accept input of confirmation information of a confirmed intention of the replacement of the motor after the replacement of the motor has occurred, wherein
   when the motor replacement detection circuit detects that the replacement of the motor by the replacement motor has occurred, the switching circuit switches the control circuit to execute the limiting processing for limiting the action of the replacement motor in a case the encoder of the motor is a non-incremental encoder, at least until the acceptance circuit accepts the input of the confirmation information, and the switching circuit switches the control circuit to not execute the limiting processing on the replacement motor in a case the encoder of the motor is an incremental encoder.

2. The motor control apparatus according to claim 1, wherein the limiting processing comprises: at least one of processing of making, from outside, an instruction for the control circuit become invalid, processing of forbidding outputting a drive signal to the motor, or processing of inhibiting an output value of the drive signal for the motor.

3. The motor control apparatus according to claim 1, wherein the limiting processing comprises processing of enabling an instruction of a specific type in multiple instructions from the outside not to be executed.

4. The motor control apparatus according to claim 1, wherein when the motor replacement detection circuit detects the replacement of the motor by a replacement motor has occurred, the control circuit executes the limiting processing in the case the encoder of the motor is a non-incremental encoder, until the acceptance circuit accepts the input of the confirmation information of the confirmed intention of the replacement of the motor and origin reset processing of the motor is completed.

5. The motor control apparatus according to claim 1, wherein the motor replacement detection circuit obtains control object motor information relevant to the motor as a control object, and detects whether a replacement of the motor has occurred based on the control object motor information, wherein
   the acceptance circuit accepts an update indication of the control object motor information as the confirmation information.

6. The motor control apparatus according to claim 5, wherein the control object motor information comprises inherent identification information of the motor as the control object, that is, control object motor identification information, wherein
   the motor replacement detection circuit compares whether inherent identification information of the replacement motor is consistent with the control object motor identification information, and in a case in which the inherent identification information of the replacement motor is inconsistent with the control object motor identification information, detects that the replacement of the motor has occurred.

7. The motor control apparatus according to claim 5, comprising:
   a storage, coupled to the motor replacement detection circuit, the switching circuit and the acceptance circuit, configured to store the control object motor information, wherein
   the motor replacement detection circuit obtains the control object motor information from the storage.

8. The motor control apparatus according to claim 5, wherein the motor replacement detection circuit obtains the control object motor information from the motor or the encoder of the motor.

9. The motor control apparatus according to claim 5, wherein the motor replacement detection circuit obtains the control object motor information from an upper controller connected to the motor control apparatus.

10. The motor control apparatus according to claim 1, comprising:
    a notification circuit, coupled to the motor replacement detection circuit, configured to notify state of the motor, wherein
    in a case in which the motor replacement detection circuit detects the replacement of the motor, the notification circuit notifies abnormal information of the intention of the replacement of the motor.

11. The motor control apparatus according to claim 10, wherein in a case in which the acceptance circuit accepts the input of the confirmation information of the confirmed intention of the replacement of the motor, the notification circuit removes the abnormal information, and after the abnormal information is removed, the notification circuit notifies alarm information that indicates the intention thereof in a case in which an origin location of the motor is unclear.

12. The motor control apparatus according to claim 11, wherein in a case in which origin reset processing of the motor is performed, the notification circuit removes the alarm information.

13. A non-transitory recording storage medium, wherein the non-transitory recording storage medium records an information processing program to be loaded and executed by a computer to cause the computer to perform as the motor control apparatus of claim 1.

14. A motor control method for performing motor control, wherein the motor control method comprises:
    a motor replacement detection step: detecting whether a replacement of the motor has occurred;
    an encoder type determining step: obtaining a motor usage information of the motor and determining whether an encoder of the motor is an incremental encoder or a non-incremental encoder according to the motor usage information of the motor; and
    an action limiting step: when the replacement of the motor has occurred, and is detected in the motor replacement detection step, performing limiting action of a motor after the replacement in a case the encoder of the motor is detei wined as the non-incremental encoder in the encoder type determining step, at least until input of confirmation information of a confirmed intention of the replacement of the motor is accepted.

* * * * *